Feb. 17, 1942.  H. W. KOST  2,273,648
FASTENER
Filed Feb. 8, 1940
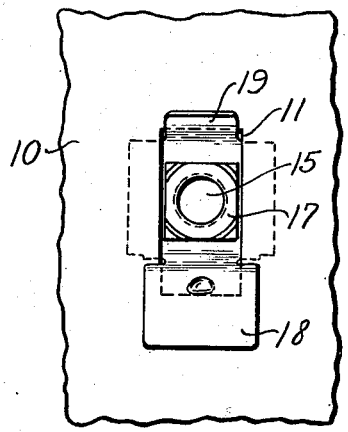
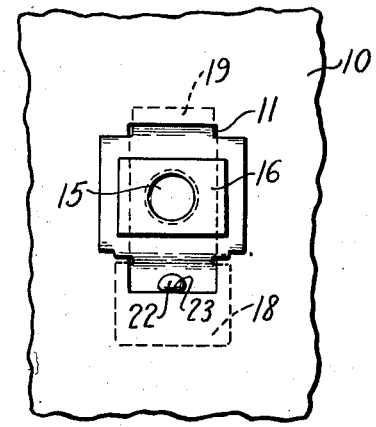
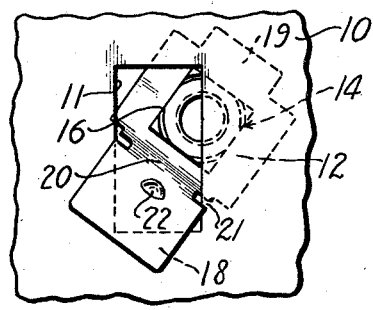
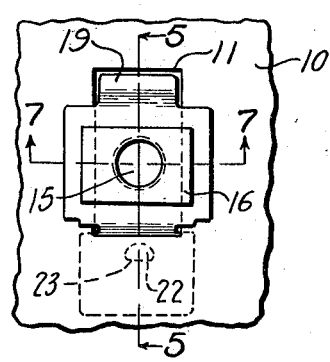
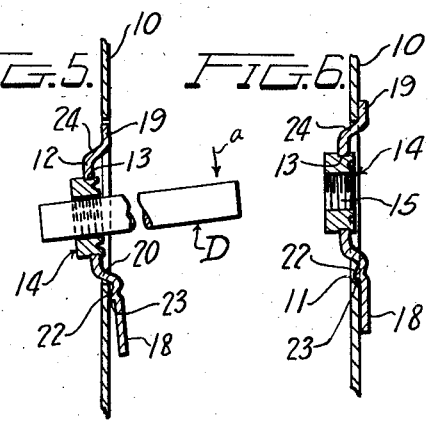
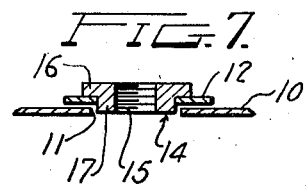
Inventor
Harold W. Kost
By Malcolm W. Fraser
Attorney Patented Feb. 17, 1942

2,273,648

UNITED STATES PATENT OFFICE 2,273,648

FASTENER

Harold W. Kost, Birmingham, Mich., assignor to Detroit Harvester Company, Detroit, Mich., a corporation of Michigan Application February 8, 1940, Serial No. 317,907

9 Claims. (Cl. 85—32)

This invention relates to fasteners but more particularly to those fastening devices which are adapted to receive a screw-threaded member and are in the form of a separate piece applied to a supporting structure to which the fastener is held preparatory to receiving the screw or bolt. In attaching fenders to automobile bodies, it has heretofore been the practice to form in the body structure an assembling opening which is arranged adjacent a separate bolt receiving opening. The fastener in the form of a sheet metal strip having screw-thread engaging means has been inserted through the assembling opening so that the nut is on the inside of the body with the screw threaded hole in alignment with the bolt receiving opening and suitable means is employed to retain the fastener in position in such manner that the assembling opening is substantially sealed. Although fastening devices of the above character have in the main proved satisfactory, they are not entirely free from objections. It is found that an efficient seal is not effected without the use of additional sealing material and the application of such sealing material is time-consuming and somewhat costly. Furthermore, the forming of two openings in the body structure is not altogether desirable.

An object of this invention is to produce a new and improved fastener which can be employed for attaching fenders to automobile bodies and which employs but a single opening in the body structure and is so designed as to afford a more efficient seal.

Another object is to produce a fastener having a nut and which can be mounted in a single assembly opening with the nut disposed on the inner side of the supporting structure and which is designed to overlap not only the side portions but also the end portions of the opening thereby substantially to seal the opening against the entrance of water, dirt and the like.

Other objects and advantages of the invention will hereinafter appear, and for purposes of illustration but not of limitation, an embodiment of the invention is shown on the accompanying drawing in which Figure 1 is a plan view of the supporting structure and fastener viewing the same from the outer side of the supporting structure;

Figure 2 is a plan view of a fragment of a supporting structure showing the fastener in place and viewing t' supporting structure from the underside thereof;

Figure 3 is a bottom plan view of a fragment of the supporting structure showing one position of the fastener during the assembly operation;

Figure 4 is a view similar to Figure 3 showing the fastener in position prior to final shifting movement;

Figure 5 is a sectional view on the line 5—5 of Figure 4 showing a fastener being applied to the supporting structure with the aid of a drift pin;

Figure 6 is a sectional view similar to Figure 5 but showing the fastener in its final position; and Figure 7 is a sectional view on the line 7—7 of Figure 4.

The illustrated embodiment of the invention comprises a supporting structure 10 in the form of a sheet metal panel provided with a longitudinally elongate rectangular opening 11. By way of example, the supporting structure 10 may constitute a portion of the side quarter panel of an automobile body and particularly that region of the side quarter panel which receives the fender, a number of openings 11 being suitably arranged to receive the fasteners hereinafter described, to enable the fender to be securely mounted in place.

The fastener comprises a sheet metal body portion 12 which is considerably wider than the narrow dimension of the opening 11 so that in the final applied position of the fastener, the body overlaps opposite sides of the opening 11 on the inner side of the panel 10. The body portion 12 is formed with a centrally arranged opening 13 to receive a separate nut 14 having a screw-threaded opening 15. In this instance, the nut 14 has a head 16 which is elongate transversely, being longer than the width or narrow dimension of the opening 11. The head 16 is formed with a reduced axial extension 17 which fits the hole 13 of the fastener body 12. The extension 17 is upset on the opposite side in order to clinch the nut to the body. As shown in Figure 1, the nut extension 17 is slightly smaller than the width of the opening 11 in order to extend into the opening so that the outer face of the extension 17 may be substantially flush with the outer side of the supporting panel 10 when the fastener is in its applied position.

Extending in opposite directions from the fastener body 12 are offset tongues 18 and 19 which are substantially in alignment with each other. The tongue 18 is considerably longer and wider than the tongue 19, being adapted to overlap a portion of the outer side of the panel 10 both at the end and sides of the opening 11. The tongue 18 is integrally secured to the body 12 by a neck portion 20 which is considerably narrower than the tongue 18, the neck being of substantially the same width as the width or narrow dimension of the opening 11, slots or cutouts 21 being formed between the tongue 18 and body 12 to form the reduced neck 20. Pressed out of the tongue 18 intermediate the side edges thereof and adjacent the neck 20 is a detent 22 in the form of a slight protuberance formed with a shoulder or stop 23 on the raised portion thereof for a purpose which will hereinafter appear.

The relatively short tongue 19 has a width substantially equal or slightly less than the width or narrow dimension of the opening 11 and is connected to the body 12 by an integral portion which provides a shoulder or stop 24 which is adapted to abut against the adjacent end wall of the opening 11 in the final applied position of the fastener.

In applying the fastener to the supporting structure, the tongue 18 is grasped and the body and associated structure is inserted through the longer dimension of the opening 11 so that the head 16 of the nut 14 is lowermost. Thereafter the fastener is rocked to position the body 12 on the under side of the supporting structure, the reduced neck 20 enabling the fastener to be so positioned. It will be understood that the fastener is rocked to position or locate the smaller tongue 19 in registry with the opening 11 or to the position indicated on Figure 4. In this position, the detent 22 on the tongue 18 militates against the fastener being shifted longitudinally to move the tongue 19 in overlapping engagement with the outer side of the panel or supporting structure 10. By the use of a drift pin D inserted through the screw-threaded opening 15 and imparting movement in the direction of the arrow a (Figure 5) the tongue 19 can be moved to such position that the fastener can be shifted longitudinally so that the tongue 19 overlaps the outer side of the supporting panel 10. The fastener should be shifted longitudinally in this manner until the shoulder 24 abuts the adjacent end of the opening 11. The shoulder 24 is so related to the detent 22 that the latter will have snapped into the opening 11 to abut against one end of the opening 11 when the shoulder 24 is in engagement or in abutting relation to the opposite end of the opening 11.

From the above description, it will be apparent that the fastener which can be readily manufactured on a production basis can be mounted in a single opening so that the nut is disposed on the side of the opening. Since the fastener body overlaps the side of the supporting structure and the sides of the opening and since the tongues overlap the end portions of the opening, a more effective seal against the entrance of water and dirt is made possible. It will be manifest that the seal is not a hermetic one but is effective for practical purposes. It will be apparent that instead of a separate nut, an integral screw-receiving element may be formed from the metal of the body portion. It is also to be understood that a fastener of this character can be used to advantage for purposes other than attaching fenders to bodies as, for example, in stoves and refrigerator cabinets.

It is to be understood that numerous changes in details of construction, arrangement and operation may be effected without departing from the spirit of the invention especially as defined in the appended claims.

What I claim is:

1. A fastener adapted to be secured in an assembly opening of a sheet metal structure comprising a body portion overlapping opposite sides of the opening, screw thread engaging means on said body portion in alignment with the opening for receiving a threaded member inserted therethrough, offset tongues arranged respectively on opposite sides of said screw thread engaging means and extending lengthwise of the opening, said tongues engaging the side of the structure opposite to that engaged by said body portion, shoulder means on one tongue adapted to abut against one end wall of said opening, and raised shoulder means on the other tongue adapted to snap into engagement with the opposite end wall of said opening.

2. The combination with a supporting structure having an elongate opening, of a fastener having a screw thread engaging means, the body portion of said fastener being wider than the narrow dimension of the opening, extensions on opposite ends of said body portion substantially parallel thereto, a neck adapted to fit the smaller dimension of the opening and connecting one extension to the body portion whereby the body portion is insertable in said opening from one side of the supporting structure and then turned to cause the body portion to overlap opposite sides thereof, the other extension being of a size to fit the smaller dimension of the opening, the body portion being shiftable to cause said extensions to overlap opposite ends of the opening on the side of the supporting structure opposite to that engaged by the body portion, stop means on one extension for limiting such shifting movement, and means on the other extension arranged to snap into engagement with a wall of the opening upon such shifting movement.

3. The combination with a supporting structure having an elongate opening, of a fastener having screw thread engaging means, the body portion of said fastener being wider than the narrow dimension of the opening, extensions on opposite ends of said body portion substantially parallel thereto, a neck adapted to fit the smaller dimension of the opening and connecting one extension to the body portion whereby the body portion is insertable in said opening from one side of the supporting structure and then turned to cause the body portion to overlap opposite sides thereof, the other extension being of a size to fit the smaller dimension of the opening, the body portion being shiftable to cause said extensions to overlap opposite ends of the opening on the side of the supporting structure opposite to that engaged by the body portion, stop means on one extension for limiting such shifting movement, and a detent in the form of a nubbin pressed from the other extension arranged to snap into the opening and against an end wall upon such shifting movement.

4. A fastener comprising a sheet metal body, screw thread engaging means carried by said body, and means for attaching said body in an aperture of a supporting structure, said attaching means including a relatively long tongue offset from said body and in substantially parallel relation thereto and adapted to engage the side of the supporting structure opposite to that engaged by said body, a neck of approximately the width of said aperture connecting said tongue and body, a detent on said tongue adapted to engage an end wall of the aperture, and a relatively short tongue on the opposite side of said body offset therefrom to provide a shoulder adapted to abut against the adjacent end wall of the aperture upon engagement of said detent with the opposite end wall of the aperture.

5. A fastener comprising a sheet metal strip, screw thread engaging means carried by said strip, means for securing said strip to a supporting structure provided with an aperture, said securing means comprising relatively rigid offset tongues on opposite sides of said screw thread engaging means and extending in opposite directions, one of said tongues providing a shoulder to abut against a wall of said aperture, and a detent on the strip adapted to snap into engagement with a portion of the supporting structure and cooperate with said shoulder for holding the fastener against shifting movement, the screw thread engaging means being aligned with the aperture with which said tongues are associated.

6. A fastener for mounting in an opening of a supporting structure comprising a sheet metal body wider than the opening and adapted to be inserted through the opening to overlap the inner sides thereof, a separate nut carried by said body to receive a screw-threaded member inserted in the opening from the outer side of the supporting structure, relatively rigid offset tongues disposed at opposite ends of said body and aligned with each other, the inner end of each tongue extending outwardly from the adjacent end of said body, said tongues being adapted to overlap the outer side of the supporting structure and engage the sides of the opening to prevent sidewise movement of the fastener, stop means on one tongue engaging an end wall of the opening, and means on the other tongue adapted to enter the opening and engage an opposite end wall thereof to cooperate with said stop means for holding the fastener against endwise movements.

7. A fastener for mounting in an opening of a supporting structure comprising a sheet metal body wider than the opening and adapted to be inserted through the opening to overlap the inner sides thereof, screw engaging means on said body to receive a screw-threaded member inserted through the opening, offset tongues disposed at opposite ends of said body and aligned with each other, one tongue being substantially the width of the opening, a neck of substantially the width of the opening joining the other tongue to said body, said other tongue being wider than the opening, a shoulder on said first tongue adapted to abut against one end of the opening, and a detent pressed from said other tongue adapted to snap into the opening upon engagement of said shoulder with the adjacent end wall.

8. The combination with a supporting structure having an elongate opening, of a fastener having a screw thread engaging means, the body portion of said fastener being wider than the narrow dimension of the opening, offset extensions on opposite ends of said body portion, one extension being wider than the narrow dimension of said opening, a neck portion adapted substantially to fit the smaller dimension of the opening and connecting said last extension to the body portion whereby the body portion is insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion and to position said screw thread engaging means in registry with said elongate opening, stop means on one extension for limiting such shifting movement, and means for militating against retrograde shifting movement.

9. The combination with a supporting structure having an elongate opening, of a fastener having a screw thread engaging means, the body portion of said fastener being wider than the narrow dimension of the opening, offset extensions on opposite ends of said body portion, one extension being wider than the narrow dimension of said opening, a neck portion adapted substantially to fit the smaller dimension of the opening and connecting said last extension to the body portion whereby the body portion in insertable in said opening from one side of the supporting structure and then turned to cause the body portion to overlap opposite sides thereof, the other extension being of a size to pass through the smaller dimension of the opening, the body portion being shiftable to cause said extensions to overlap opposite ends of the opening on the side of the supporting structure opposite to that engaged by the body portion and to position said screw thread engaging means in registry with said elongate opening, means for limiting such shifting movement, and means for retaining the body portion against retrograde movement.

HAROLD W. KOST.